June 7, 1927.
T. COLLINS, JR
SPEED INDICATOR
Filed Dec. 9, 1925
1,631,796
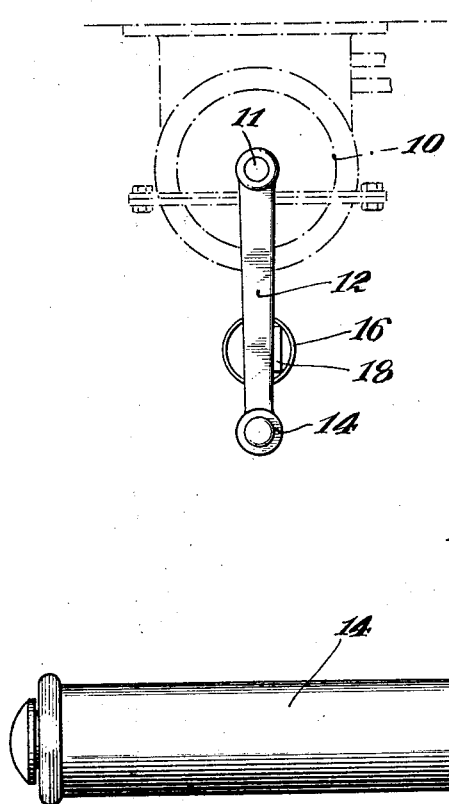
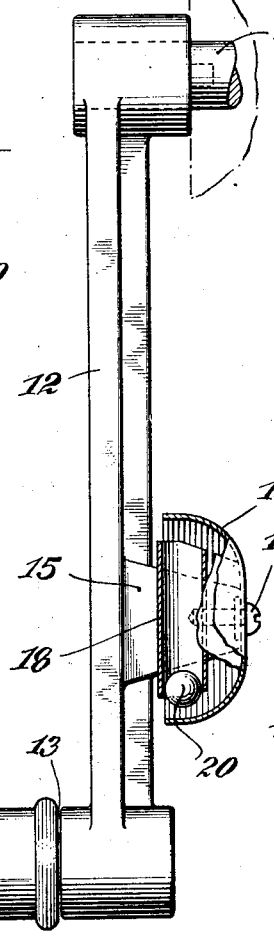
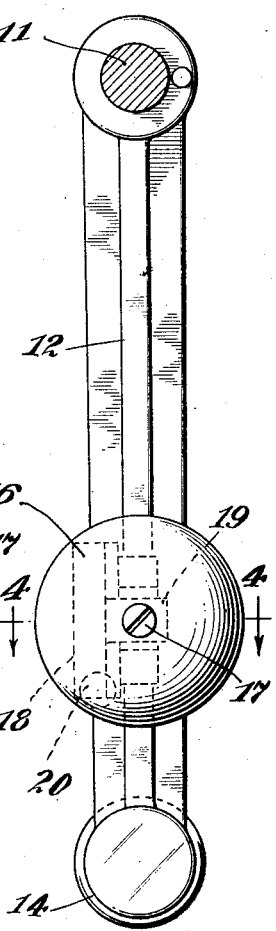
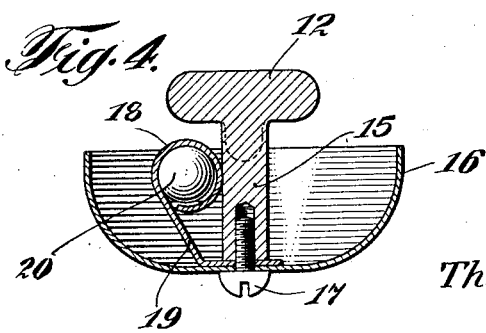
INVENTOR
Thomas Collins Jr
BY
ATTORNEYS Patented June 7, 1927.

1,631,796

UNITED STATES PATENT OFFICE.

THOMAS COLLINS, JR., OF BAINBRIDGE, NEW YORK, ASSIGNOR TO THE AMERICAN SEPARATOR COMPANY, OF BAINBRIDGE, NEW YORK, A CORPORATION OF NEW YORK.

SPEED INDICATOR.

Application filed December 9, 1925. Serial No. 74,232.

My present invention relates to a speed indicator adapted to be attached to a crank or other revolving member of a cream separator or similar device to enable the operator to determine the minimum speed at which the revoluble member must be turned to effect an efficient operation of the separator or other apparatus with which the speed indicator is employed. My improved speed indicator is particularly adapted for use in cream separators but as will be understood its employment is not necessarily so limited.

I am aware that heretofore various types of indicators have been devised and employed for purposes similar to that for which my improved speed indicator is particularly adapted, for example in this type of speed indicator I am aware that heretofore a gong or bell has been employed and fitted with a guide member within which there is a striker actuated by the influences of centrifugal force and gravity, to strike the bell or gong and thus produce an audible signal when the revoluble speed of the indicator is less than a predetermined number of revolutions in a specified unit of time, and in which type of indicator there is a stop employed at the outer end of the guide, that is, the end distant from the center of revolution, against which the striker engages when the speed reaches a predetermined limit. This type of speed indicator is serviceable for some purposes, but has been found in practice to be insufficiently sensitive for satisfactory use in centrifugal cream separators. I have found in carrying on various experiments that by employing an open ended guide with a reciprocating striker therein the sensitiveness of the indicator is materially increased. By so doing as will be understood, the indicator at predetermined speeds will make two audible alarms with each revolution. When the speed is greater than the necessary maximum, the striker lies against the inner surface of the gong or bell. When however, the speed is slightly less than the desired maximum, the result of the action of centrifugal force and the force of gravity causes the striker to move a slight distance from the inner surface of the gong or bell and to be retained in such position during a portion of each revolution and to move toward and against the gong or bell to strike the same at another portion of each revolution, whereby it will be understood the indicator is particularly sensitive and the operator may readily determine the speed at which the apparatus must be turned to obtain efficient results.

The speed indicator made in accordance with my invention will be hereinafter more particularly described in conjunction with the accompanying drawings, in which Figure 1 is a diagrammatic elevation of a part of a separator illustrating the crank arm and the speed indicator connected therewith.

Fig. 2 is an enlarged side elevation and partial cross section.

Fig. 3 is a front elevation, and

Fig. 4 is a section on line 4—4, Fig. 3.

In the drawing a portion of a cream separator for the purposes of illustration is diagrammatically shown at 10. The drive shaft of the separator is illustrated at 11. As is customary the drive shaft is provided with a crank arm 12 and this is fitted with a pin 13 and a handle 14 by which the crank may be operated to turn the drive shaft and thus operate the separator. In a suitable position the crank arm 12 is provided with a bracket 15 attached to which is a bell or gong 16. As illustrated, the bell 16 is secured to the bracket by means of a screw 17, although as will be understood, this connection may be made in any suitable manner. Within the bell I employ a slideway 18. This is preferably cylindrical and is fitted with a flange 19 so that the slideway may be secured in position by means of the same screw 17 which secures the bell in place on the bracket of the crank arm. The slideway 18 is adjacent the side of the bracket and consequently is offset from the center line of the crank arm, although as will be understood, the construction may be such that this slideway will be in alignment with the crank arm. Within the slideway 18 there is a striker or a slide member 20 which as illustrated is in the form of a ball. Of course, it will be understood that the slideway may be of any suitable shape and the striker made to conform therewith so that through the action of centrifugal force and gravity it will reciprocate in the slideway so as to strike the gong when the revoluble speed of the crank is less than a predetermined number of revolutions in a unit of time, and to lie against the bell at the outer end of the slideway when and after the revolution of the crank arm reaches a predetermined point. It will also be understood as hereinbefore stated, that due to the action of centrifugal force and gravity when the speed of the crank arm is slightly less than the desired maximum, the striker will move and be retained a slight distance from the bell during a portion of each revolution and another part of each revolution will move toward and strike the bell. It will also be understood of course, that when the revoluble movement of the crank arm is sufficiently slow, the striker will contact twice with the bell during each revolution of the crank arm.

I claim as my invention:

In a speed indicator, a crank arm, a bracket carried by the crank arm, a bell, an open ended slideway lying in an offset position within the bell with the open ends thereof adjacent oppositely disposed surface portions of the bell, a reciprocating member in the slideway, and a unitary means for simultaneously securing the bell to the crank arm bracket and connecting the slideway in its offset position within the bell.

Signed by me this 1st day of Dec. 1925.

THOMAS COLLINS, Jr.